United States Patent Office 3,481,962
Patented Dec. 2, 1969

3,481,962
PROCESS FOR THE PRODUCTION OF ORGANOSILOXANES
Walter Simmler, Cologne-Mulheim, and Hans Niederprum, Monheim, Germany, assignors to Farbenfabriken Bayer Aktiengesellschaft, Leverkusen, Germany, a corporation of Germany
No Drawing. Filed June 29, 1965, Ser. No. 468,095
Claims priority, application Germany, July 30, 1964,
F 43,616
Int. Cl. C07f 7/18
U.S. Cl. 260—448.2     5 Claims

ABSTRACT OF THE DISCLOSURE

Process for producing organosiloxanes having siloxane units of both the formula

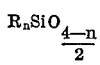

and of the formula $$O_{1/2}\text{—Si}(CH_3)_2\text{—}CH_2\text{—}X\text{—}A\text{—}Y\text{—}H$$

wherein the X—A—Y group is one of the following:

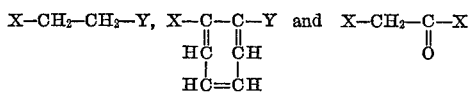

X is at least one member selected from the group consisting of $CH_2$ and Y, and Y is a bivalent atom selected from the group consisting of oxygen and sulfur, and wherein the R is a substantially non-reactive hydrocarbon or substituted hydrocarbon substituent, by hydrolyzing a compound of the formula

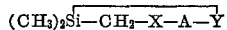

in the presence of a hydrolyzable organosilane of the formula $R_nSiZ_{4-n}$ or a mixture of such silanes or a polymer containing such silane groups in the presence of an acid or alkaline catalyst and water at about room temperature to produce compounds of the formula

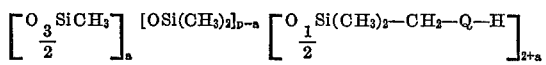

The compounds are useful as emulsifiers.

---

The present invention relates to organopolysiloxanes, and especially to the production of organopolysiloxanes which contain at least two terminal carbofunctional siloxane units of the formula

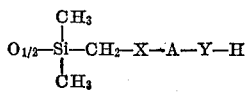

in the molecule. In this formula X—A—Y stands for the group

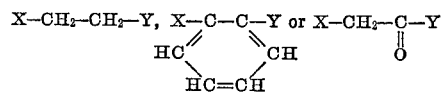

X stands for a $CH_2$ group or for Y, and Y stands for an oxygen or sulfur atom or an NH or N-alkyl group. The remaining siloxane units if any in the polysiloxanes to be produced according to the invention are those of the general formula

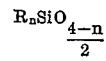

in which $n$ is 1 or 2 and each substituent R is an aliphatic, cycloaliphatic or aromatic, optionally inertly substituted, hydrocarbon radical, preferably methyl or phenyl.

It is known that compounds of this type can be obtained in some cases by reacting a halomethyl-substituted polysiloxane with a compound of the formula $$H\text{—}X\text{—}A\text{—}Y\text{—}H$$

in the presence of an acid-binding substance. In such a process, however, side reaction frequently occurs, leading to undesired and useless products. Especially if X and Y are identical, for example, the reaction may easily proceed in such a manner that condensation takes place not only at the H—X group, but also at the H—Y group. This results in the production of highly viscous cross-linked polymers. Moreover, compounds containing oxygen as X require either very long reaction times or strong bases, such as alkali metal hydroxides, as condensation agents, leading to the splitting of Si—C bonds.

We have now found a process for the production of the terminally carbofunctional organopolysiloxanes defined above which is distinguished by its simplicity and the certainty with which the desired products are obtained, which process is based on a hydrolytically initiated copolymerization with the use of a monosila-cyclohexane-analogous compound.

Accordingly, the process of the invention is characterised in that a mixture of (a) a compound of the formula

in which the grouping X—A—Y is as defined above, and (b) a hydrolyzable organosilane of the formula $R_nSiZ_{4-n}$, in which $n$ and R are as defined above and Z is a halogen atom or a lower alkoxy radical, or a mixture of such organosilanes, or a polymer resulting from such organosilanes by hydrolysis and condensation and consisting of siloxane units of the formula $R_nSiZ'_{4-n}$, in which $n$ and R are as defined above and Z' denotes $-O_{1/2}$ or $-OH$, is subjected to the presence of an alkaline or acidic catalyst to a hydrolytic reaction with sufficient water for the stoichiometrically calculated molar ratio of $H_2O$ to the sum $(Y+Z)$ in the reaction mixture to amount to at least 1:2.

The monosila-cyclohexane analogues mentioned above under (a) are known; examples are:

| | 2　　　　1 | |
|---|---|---|
| 2,2-dimethyl-1-oxa-2-silacyclohexane | (CH₃)₂Si—(CH₂)₄—O | |
| 2,2-dimethyl-2-sila-1,4-dioxan | (CH₃)₂Si—CH₂—O—CH₂—CH₂—O | |
| 2,2-dimethyl-2-sila-1-oxa-4-thiane | (CH₃)₂Si—CH₂—S—CH₂—CH₂—O | |
| 2,2-dimethyl-2-sila-1,4-dithiane | (CH₃)₂Si—CH₂—S—CH₂—CH₂—S | |
| 2,2-dimethyl-2-silamorpholine | (CH₃)₂Si—CH₂—NH—CH₂—CH₂—O | |
| 2,2,4-trimethyl-2-silamorpholine | (CH₃)₂Si—CH₂—N(CH₃)—CH₂—CH₂—O | |
| 1,2,2,4-tetramethyl-2-silapiperazine | (CH₃)₂Si—CH₂—N(CH₃)—CH₂—CH₂—NCH₃ | |
| Benzo-2,2-dimethyl-2-sila-1,4-dioxan | (CH₃)₂Si—CH₂—O—C—C—O<br>　　　　　　　　　　HC　　CH<br>　　　　　　　　　　　HC=CH | |
| Benzo-2,2-dimethyl-2-sila-1,4-dithiane | (CH₃)₂Si—CH₂—S—C—C—S<br>　　　　　　　　　　HC　　CH<br>　　　　　　　　　　　HC=CH | |
| Benzo-2,2-dimethyl-2-sila-1-aza-4-thiane | (CH₃)₂Si—CH₂—S—C—C—NH<br>　　　　　　　　　　HC　　CH<br>　　　　　　　　　　　HC=CH | |
| Benzo-2,2-dimethyl-2-sila-1-oxa-4-azane | (CH₃)₂Si—CH₂—NH—C—C—O<br>　　　　　　　　　　HC　　CH<br>　　　　　　　　　　　HC=CH | |
| Benzo-2,2-dimethyl-2-sila-1,4-diazine | (CH₃)₂Si—CH₂—NH—C—C—NH<br>　　　　　　　　　　HC　　CH<br>　　　　　　　　　　　HC=CH | |
| 2,2-dimethyl-6-oxa-2-sila-1-oxa-4-thiane | (CH₃)₂Si—CH₂—S—CH₂—C—O<br>　　　　　　　　　　　　　　‖<br>　　　　　　　　　　　　　　O | |

Of the hydrolyzable organosilanes to be used according to the invention, the following are those most easily obtainable: dimethyl dichlorosilane, phenylmethyl dichlorosilane, methyl trichlorosilane, dimethyl diethoxysilane and methyl triethoxysilane. Examples of their hydrolysis and condensation products are α,ω-dihydroxy-polydimethyl siloxanes, hexamethyl cyclotrisiloxane and octamethyl cyclotetrasiloxane.

particular advantage of permitting also the production of very long-chained polysiloxanes with terminal carbofunctional groups, which cannot be prepared in any other way, since highly polymerized organosiloxanes with a low content of halomethyl groups do not react appreciably with hydrogen-active compounds.

The following examples are given for the purpose of illustrating the invention.

EXAMPLE 1

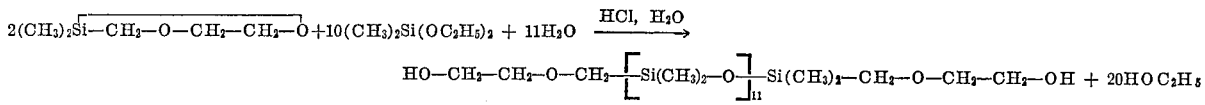

2(CH₃)₂Si—CH₂—O—CH₂—CH₂—O + 10(CH₃)₂Si(OC₂H₅)₂ + 11H₂O $\xrightarrow{HCl, H_2O}$ HO—CH₂—CH₂—O—CH₂—[Si(CH₃)₂—O]₁₁—Si(CH₃)₂—CH₂—O—CH₂—CH₂—OH + 20HOC₂H₅

By means of the process described above, carbofunctional siloxanes with terminal hydrogen-active carboxyl, hydroxyl, mercaptan or amine groups are obtained in a simple manner. A great number of applications are known for compounds of this type. For example, the amino-functional organosiloxanes are especially suitable as emulsifiers and other interface-active agents. The products can also be used for the production of polysiloxane-polyoxyalkylene copolymers and of silicon-containing polyesters and polyurethanes. Furthermore, they may be used for the modification of synthetic resins, such as polycarbonates and phenol-formaldehyde resins, and also of organo-polysiloxane elastomers. For the last-mentioned case the process according to the invention presents the 110 cc. hydrochloric acid with an HCl-content of 4-percent by weight are slowly added at room temperature over a period of 30 minutes to a solution of 132 g. (1 mol) 2,2-dimethyl-2-sila-1,4-dioxan and 740 g. (5 mol) dimethyl diethoxy-silane in 500 cc. ethanol, and the reaction mixture is allowed to stand for one day. The volatile components of the mixture are then distilled off under reduced pressure, finally at up to 65° C. and 1 mm. Hg, and the residue is filtered. As filtrate there are obtained 407 g. (approximately 80% of the theoretical amount) of a colourless oil which contains 2.8 percent by weight OH groups and whose acid number is 0.5. At 20° C. its refractive index $n_D^{20}$ is 1.4162, its density is 0.985 g./cc. and its viscosity is 32.4 cst.

For the dodeca-siloxane according to the reaction equation the content of OH groups is calculated as 3.3 percent by weight.

EXAMPLE 2

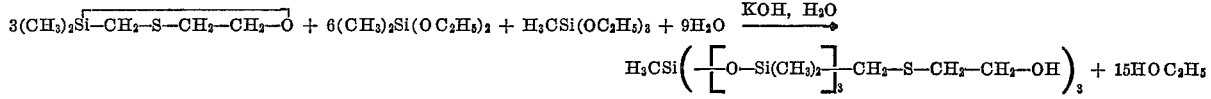

A solution of 5 g. potassium hydroxide in 180 cc. water is added to a solution of 493 g. (3 mol) 2,2-dimethyl-2-sila-1-oxa-4-thiane, 890 g. (6 mol) dimethyl diethoxysilane and 178 g. (1 mol) methyl triethoxysilane in 3000 cc. ethanol, and the mixture is stirred at room temperature for two days. The reaction mixture is then neutralized by introducing carbon dioxide, it is filtered, the filtrate is freed from all volatile components by heating it up to 60° C. at 1 mm. Hg, and it is again filtered. As filtrate there are obtained 835 g. (approximately 85% of the theoretical amount) of a colourless oil whose refractive index $n_D^{20}$ is 1.4532; the viscosity at 20° C. is 39 cst., the sulfur content amounts to 10.0 percent by weight and the content of OH groups to 5.1 percent by weight.

For the deca-siloxane according to the reaction equation there are calculated 9.8 percent by weight sulfur and 5.2 percent by weight OH groups.

EXAMPLE 3

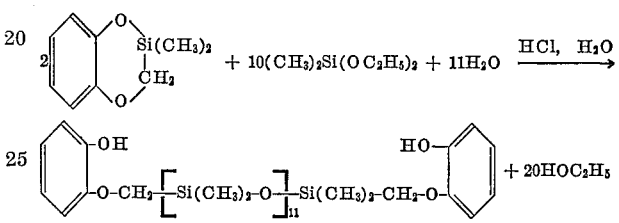

A solution of 15 g. potassium hydroxide in 60 cc. water is added to a mixture of 888 g. (6 mol) 2,2-dimethyl-2-sila-1-oxa-4-thiane and 2220 g. (10 mol) hexamethylcyclotrisiloxane, and the mixture is stirred at room temperature for one day. The reaction mixture is then diluted with 6000 cc. benzene, the solution is neutralized by introducing carbon dioxide, it is filtered, and the solvent is evaporated from the filtrate by heating it up to 80° C. at 2 mm. Hg. As product there remains a colourless oil (82% of the theoretical amount), whose refractive index $n_D^{20}$ is 1.4326; the viscosity at 20° C. is 48 cst., the sulfur content amounts to 5.8 percent by weight and the content of OH groups to 2.9 percent by weight.

For the dodeca-siloxane according to the reaction equation there are calculated 6.05 percent by weight of sulfur and 3.2 percent by weight of OH groups.

EXAMPLE 4

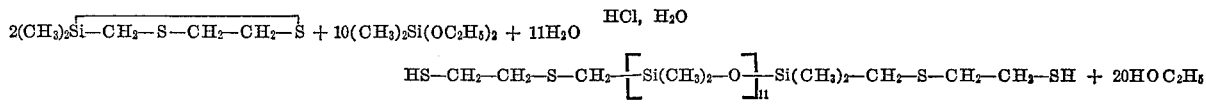

200 cc. hydrochloric acid with an HCl-content of 5 percent by weight are added to a solution of 164 g. (1 mol) 2,2-dimethyl-2-sila-1,4-diethiane and 740 g. (5 mol) dimethyl diethoxysilane in 1500 cc. acetone, and the reaction mixture is allowed to stand at room temperature for one day. The mixture is then freed from volatile components by heating it up to 60° C. at 1 mm. Hg, and the remaining oil is filtered. As filtrate there are obtained 380 g. (approximately 70% of the theoretical amount) α,ω - di-(β' - mercaptoethyl - mercaptomethyl) - polydimethyl-siloxane with refractive index $n_D^{20}$ 1.4552 and a sulfur content of 12.5 percent by weight.

For the dodeca-siloxane according to the reaction equation there are calculated 11.8 percent by weight of sulfur.

EXAMPLE 5

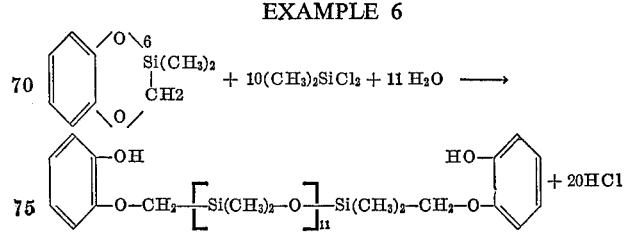

220 cc. hydrochloric acid with an HCl-content of 4 percent by weight are added to a solution of 360 g. (2 mol) benzo-2,2-dimethyl-2-sila-1,4-dioxan and 1480 g. (10 mol) dimethyl diethoxy-silane in 1000 cc. ethanol, and the reaction mixture is allowed to stand at room temperature for one day. The mixture is then freed from volatile components by heating it up to 80° C. at 1.5 mm. Hg and the residue is filtered. As filtrate there are obtained 1023 g. (approximately 92% of the theoretical amount) of a colourless oil containing 3.3 percent by weight of phenolic OH groups. At 20° C. its refractive index $n_D^{20}$ is 1.4458, its density is 1.025 and its viscosity is 19 cst.

For the dodeca-siloxane according to the reaction equation the content of OH groups is calculated as 3.05 percent by weight.

EXAMPLE 6

A mixture of 1500 cc. ethanol and 150 cc. water is added dropwise while cooling to a mixture of 180 g. (1 mol) benzo-2,2-dimethyl-2-sila-1,4-dioxan and 645 g. (5 mol dimethyl dichlorosilane, and the reaction mixture is stirred for 4 hours. The volatile components are then evaporated off in a vacuum, and the residue is filtered. As filtrate there are obtained 450 g. (approximately 81% of the theoretical amount) of a yellowish oil containing 2.6 percent by weight of OH groups. At 20° C. its refractive index $n_D^{20}$ is 1.4380, its density is 1.02 and its viscosity is 28 cst. The infrared spectrum is essentially the same as that of the product according to Example 5.

EXAMPLE 7

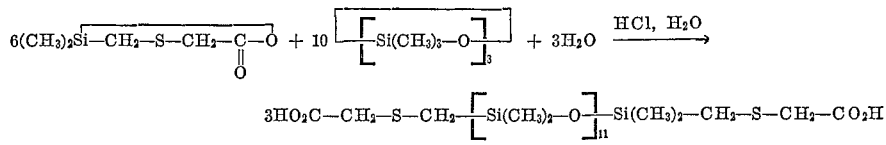

300 cc. hydrochloric acid with an HCl-content of 38 percent by weight are added to a solution of 487 g. (3 mol) 2,2-dimethyl-6-oxo-2-sila-1-oxa-4-thiane and 1110 g. (5 mol) hexamethyl cyclotrisiloxane in 4500 cc. tetrahydrofuran, and the reaction mixture is allowed to stand for two days. The solvent is then distilled off under reduced pressure, the mixture being finally heated up to 70° C. at 1 mm. Hg., and the residue is filtered. As filtrate there are obtained 1425 g. (approximately 88% of the theoretical amount) of a yellowish oil which contains 6.4 per cent by weight sulfur and whose acid number is 104; its refractive index $n_D^{20}$ is 1.4356.

For the dodeca-siloxane according to the reaction equation there are calculated 5.9 percent by weight of sulfur and an acid number of 103.

What we claim is:

1. As a novel carbofunctional organopolysiloxane a compound having the formula:

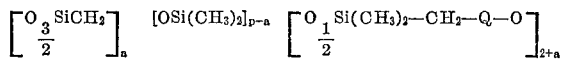

in which $a$ has a value up to 1, $p$ is an integer from 7 to 10 and the carbofunctional group Q—H is at least one member selected from the group consisting of:

S—CH₂—CH₂—S—H
S—CH₂—CH₂—O—H

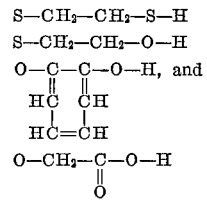

O—CH₂—C—O—H
‖
O

2. A process for the production of an organosiloxane consisting of siloxane units of the formula $$R_nSiO_{\frac{4-n}{2}}$$

and those of the formula

O₁/₂—Si(CH₃)₂—CH₂—X—A—Y—H in which $n$ is an integer selected from the group consisting of 1 and 2, each substituent R is a radical containing a hydrocarbon constituent bonded to said Si, the group X—A—Y is at least one member selected from the group consisting of

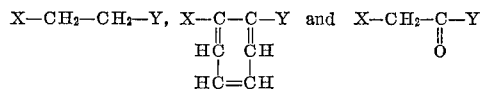

X is at least one member selected from the group consisting of CH₂ and Y, and Y is a bivalent atom selected from the group consisting of oxygen and sulfur; which process comprises hydrolyzing a mixture of (a) a compound of the formula

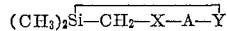

in which the group X—A—Y is as defined above, and (b) at least one member selected from the group consisting of a hydrolyzable organosilane of the formula $R_nSiZ_{4-n}$, in which $n$ and R are as defined above and Z is at least one member selected from the group consisting of halogen atoms and lower alkoxy radicals, a mixture of such organosilane and a polymer of such organosilanes, formed by hydrolysis and condensation, consisting of siloxane units of the formula $R_nSiZ'_{4-n}$, in which $n$ and R are as defined above and Z' denotes at least one member selected from the group consisting of —O₁/₂ and —OH; wherein the amount of (b) is sufficient to result in 2 to 5 Si atoms thereof per each Si atom of (a); in the presence of a catalyst selected from the group consisting of alkaline and acid with sufficient water for the stoichiometrically calculated molar ratio of H₂O to the sum (Y+Z) in the reaction mixture to amount to at least about 1:2; wherein the water admixed with said catalyst is gradually added to said mixture comprising (a) and (b) at room temperature; allowing said reaction mixture to stand until said reaction is complete; and recovering the hydrolyzation product.

3. A process according to claim 2 wherein reactant (a) is at least one member selected from the group consisting of 2,2-dimethyl-2-sila-1,4-dioxan; 2,2-dimethyl-2-sila - 1 - oxa-4-thiane; 2,2-dimethyl-2-sila-1,4-dithiane; benzo-2,2-dimethyl-2-sila-1,4-dioxan; and 2,2-dimethyl-6-oxa-2-sila-1-oxa-4-thiane.

4. A process according to claim 2 wherein reactant (b) is at least one organosilane selected from the group consisting of dimethyl dichlorosilane; phenylmethyl dichlorosilane; methyl trichlorosilane; dimethyl diethoxysilane; and methyl triethoxysilane.

5. A process according to claim 2 wherein reactant (b) is at least one polymer selected from the group consisting of an α,ω-dihydroxypolydimethyl siloxane; hexamethyl cyclotrisiloxane; and octamethyl cyclotetrasiloxane.

References Cited

UNITED STATES PATENTS

| | | |
|---|---|---|
| Re. 25,727 | 2/1965 | Haluska. |
| 2,653,516 | 8/1951 | Burkhard. |
| 2,583,322 | 1/1952 | Burkhard. |
| 3,246,048 | 4/1966 | Haluska _____ 260—448.2 X |
| 3,317,460 | 5/1967 | Clark et al. _____ 260—448.2 X |
| 2,983,745 | 5/1961 | Speier. |
| 3,041,362 | 6/1962 | Merker. |
| 3,041,363 | 6/1962 | Merker et al. |
| 3,083,219 | 3/1963 | Anderson _____ 260—448.2 XR |
| 3,271,361 | 9/1966 | Murray _____ 260—448.2 XR |
| 3,287,310 | 11/1966 | Omietanski _____ 260—448.2 XR |
| 3,332,973 | 7/1967 | Merker. |
| 3,344,161 | 9/1967 | Moedritzer et al.__260—448.2 XR |

TOBIAS E. LEVOW, Primary Examiner

P. F. SHAVER, Assistant Examiner

U.S. Cl. X.R.

252—351; 260—51, 46.5, 482

FO-1050
(5/69)

UNITED STATES PATENT OFFICE
CERTIFICATE OF CORRECTION

Patent No. 3,481,962                           Dated Dec. 2, 1969

Inventor(s) WALTER SIMMLER and HANS NIEDERPRÜM

It is certified that error appears in the above-identified patent and that said Letters Patent are hereby corrected as shown below:

Column 3, lines 68-72, correct the first structural formula to read as follows:

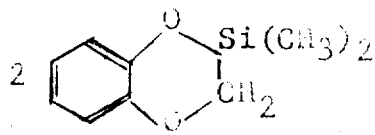

Column 8, line 55, "2,653,516" should be --2,563,516--

SIGNED AND
SEALED
MAY 12 1970

(SEAL)
Attest:

Edward M. Fletcher, Jr.                    WILLIAM E. SCHUYLER, JR.
Attesting Officer                          Commissioner of Patents